(12) United States Patent
Thomassey (10) Patent No.: US 8,777,152 B2
(45) Date of Patent: Jul. 15, 2014

(54) METHOD AND AN AIRCRAFT PROVIDED WITH A SWIVELING TAIL ROTOR

(75) Inventor: Lionel Thomassey, Fos śur Mer (FR)

(73) Assignee: Airbus Helicopters, Marignane Cedex (FR)

( * ) Notice: Subject to any disclaimer, the term of this patent is extended or adjusted under 35 U.S.C. 154(b) by 392 days.

(21) Appl. No.: 13/170,603

(22) Filed: Jun. 28, 2011

(65) Prior Publication Data

US 2012/0012693 A1  Jan. 19, 2012

(30) Foreign Application Priority Data

Jul. 13, 2010  (FR) ...................................... 10 02936

(51) Int. Cl.
*B64C 11/00* (2006.01)
(52) U.S. Cl.
USPC ..................................... 244/17.13; 244/17.19
(58) Field of Classification Search
USPC ....................... 244/17.13, 17.19, 17.11, 17.21
See application file for complete search history.

(56) References Cited

U.S. PATENT DOCUMENTS

| | | | |
|---|---|---|---|
| 2,385,889 A | | 10/1945 | Skavinsky |
| 2,959,373 A | * | 11/1960 | Zuck ............................. 244/7 C |
| 3,004,736 A | * | 10/1961 | Culver et al. .............. 244/17.21 |
| 3,155,341 A | | 11/1964 | Girard |
| 3,477,665 A | | 11/1969 | Legrand |
| 3,540,680 A | * | 11/1970 | Peterson ..................... 244/17.19 |
| 3,977,812 A | * | 8/1976 | Hudgins ........................ 416/123 |
| 4,759,514 A | * | 7/1988 | Burkam ....................... 244/17.21 |
| 5,269,654 A | * | 12/1993 | Chapman ...................... 416/120 |
| 5,749,540 A | * | 5/1998 | Arlton ......................... 244/17.13 |
| 2009/0008498 A1 | * | 1/2009 | Desroche ................... 244/17.19 |

FOREIGN PATENT DOCUMENTS

| | | |
|---|---|---|
| FR | 1017976 A | 12/1952 |
| FR | 1484732 A | 6/1967 |
| FR | 1511006 A | 1/1968 |
| FR | 1536412 A | 8/1968 |

OTHER PUBLICATIONS

Search Report and Written Opinion; Application No. FR 1002936; dated Mar. 16, 2011.

* cited by examiner

*Primary Examiner* — Christopher P Ellis
(74) *Attorney, Agent, or Firm* — Brooks Kushman P.C.

(57) ABSTRACT

A method of piloting an aircraft (1) provided with at least one rotary wing (2) and a tail rotor (10) suitable for swiveling to pass reversibly from an anti-torque mode of operation to a propulsion mode of operation, said tail rotor (10) having a plurality of second blades (12) having a second variable pitch and rotating about an axis of rotation (AX), said axis of rotation presenting a first variable salient angle ($\theta$) relative to a first plane (P1). Thus, in the anti-torque mode of operation, said second pitch is controlled using first control means (31). Furthermore, in the propulsion mode of operation, said first salient angle ($\theta$) is controlled using first control means (31) and said second pitch is controlled using second control means (32) for controlling thrust.

20 Claims, 3 Drawing Sheets

METHOD AND AN AIRCRAFT PROVIDED WITH A SWIVELING TAIL ROTOR

CROSS REFERENCE TO RELATED APPLICATIONS

This application claims the benefit of FR 10 02936 filed on Jul. 13, 2010, the disclosure of which is incorporated in its entirety by reference herein.

BACKGROUND OF THE INVENTION (1) Field of the Invention

The present invention relates to a method of piloting a rotary wing aircraft having a tail rotor suitable for swiveling about a swivel axis, and the invention also relates to such an aircraft.

More particularly, the invention relates to aircraft provided firstly with a rotary wing for providing at least some of the lift of the aircraft, and secondly with a tail rotor suitable for opposing the torque generated by the rotary wing on the airframe of the aircraft, the tail rotor being capable of swiveling about an axis in order to contribute to propelling the aircraft.

(2) Description of Related Art

The performance of a helicopter is conventionally limited by the speed of rotation of the main rotor that constitutes the rotary wing. The speed of the blades of said main rotor relative to the surrounding air must in particular remain locally less than the speed of sound. At high speed, the lifetime of the component is reduced in particular because of the appearance of vibration.

Consequently, in order to obtain a rotary wing aircraft that is capable of moving at high speed, e.g. for ecological reasons, it is possible to use an additional source of propulsion in order to reduce or eliminate the cyclic pitch of the blades of the main rotor so as to make it possible to reduce the speed of rotation of said main rotor at high forward speed.

Document FR 1 511 006 suggests using a tail pusher propeller associated with the conventional anti-torque tail rotor of a helicopter. The pusher propeller then serves to off-load the main rotor of at least a fraction of its propulsion function.

In order to optimize the performance of a helicopter, document FR 1 017 976 suggests using an aircraft fitted with a rotary wing and a tail rotor suitable for swiveling about a swivel axis.

In a first mode of operation, the tail rotor is used to counter the torque generated by the rotary wing and to provide yaw control.

In a second mode of operation, the tail rotor swivels so as to contribute to propelling the aircraft, with yaw control being obtained by steering the tail rotor on either side of a neutral position.

Such an aircraft is sometimes referred to as a "vector-thrust helicopter".

Document U.S. Pat. No. 3,155,341 presents a convertiplane having a main rotor, a swiveling tail rotor, and a wing, the convertiplane being suitable for changing over from a helicopter mode to an airplane mode.

Document FR 1 536 412 presents a mechanism for controlling the swiveling of a tail rotor of a convertiplane. That mechanism has a single outlet for controlling pitch and two inlets for controlling yaw in helicopter mode and controlling thrust in airplane mode, with the transition from one kind of control to the other taking place progressively. Thus, in airplane mode yaw control becomes inoperative whereas in helicopter mode thrust control is inoperative.

SUMMARY OF THE INVENTION

In this context, an object of the present invention is to propose a method of piloting an aircraft having a swiveling tail rotor, and also to provide such an aircraft, said aircraft having a high forward speed.

The invention provides a method of piloting an aircraft having at least one rotary wing comprising a plurality of first blades having a first variable pitch in order to provide the aircraft at least with lift, the aircraft being provided with a tail rotor suitable for swiveling to go reversibly from an anti-torque mode of operation in which the tail rotor is suitable for controlling the yaw movement of the aircraft to a propulsion mode of operation in which the tail rotor is suitable for swiveling about a swivel axis to control yaw movement in vector manner on either side of an antero-posterior first plane of symmetry of the aircraft and to control propulsion of the aircraft, at least in part, the tail rotor having a plurality of second blades having a variable second pitch and rotating about an axis of rotation, the axis of rotation of the second blades presenting a variable first salient angle relative to the first plane. This method is remarkable in that:

in the anti-torque mode of operation, the second pitch is controlled using first control means; and in the propulsion mode of operation, the first salient angle is controlled using the first control means and the second pitch is controlled using second control means.

Conventionally, a rectangular frame of reference having a longitudinal axis, a transverse axis, and an elevation axis is associated with the aircraft.

The elevation axis and the longitudinal axis together define the antero-posterior first plane of symmetry.

In a variant, the axis of rotation is contained in a plane perpendicular to the first plane and substantially parallel to a second plane defined by the transverse axis and the longitudinal axis.

Thus, in the anti-torque mode of operation, the tail rotor is controlled solely by the first control means. The tail rotor is then in a constant position for opposing the torque generated by the rotary wing on the airframe of the aircraft.

In contrast, the tail rotor may go from the anti-torque mode of operation in which the aircraft operates like a conventional helicopter to a propulsion mode of operation in which the aircraft operates like a vector thrust aircraft. In the propulsion mode of operation, second control means control the second pitch, the first control means then controlling the swivel angle of the tail rotor relative to the antero-posterior plane by controlling the value of the first salient angle.

In the propulsion mode of operation, it is possible to vary the first salient angle in order to direct the mass of air passing through the tail rotor towards the rear of the aircraft. The tail rotor acts on its own or in combination with the rotary wing to propel the aircraft. In addition, by adjusting the position of the tail rotor angularly relative to the antero-posterior first plane of symmetry, the pilot controls the aircraft in yaw.

This method makes it easy to pilot a rotary wing aircraft having a swiveling tail rotor so as to obtain a rotary wing aircraft that is capable of reaching fast forward speeds without significantly degrading over time the components that make up the system for transmitting torque to the rotary wing.

Unlike a conventional helicopter, there is no need to tilt the rotary wing forwards in order to achieve fast forward speeds, where such tilting is likely to reduce the lifetime of the rotary wing and its power gearbox, in particular.

The method may also include one or more of the following characteristics.

For example, when swiveling of the tail rotor is required about the swivel axis to pass from one mode of operation to another, a changeover from the anti-torque mode of operation to the propulsion mode of operation is performed when the first salient angle becomes less than a predetermined threshold, and a changeover from the propulsion mode of operation to the anti-torque mode of operation is performed when the first salient angle becomes greater than the first predetermined threshold.

For convenience, it should be observed that the first salient angle has a value that is positive when the tail rotor is in the requested constant position while operating in the anti-torque mode of operation, said first salient angle having a zero value when the axis of rotation is contained in the first plane, and the first salient angle having a negative value when the tail rotor is in a position that is symmetrical to said first position relative to said first plane.

Furthermore, it will be understood that it is possible to set down additional conditions in order to avoid changing the mode of operation because of atmospheric disturbances, in particular in the event of a gust of wind modifying said first salient angle.

For example, provision may be made for a minimum safety duration to elapse before proceeding with a change of operating mode. Thus, the operating mode of the tail rotor is changed when the first salient angle crosses the predetermined threshold for some minimum duration, for example.

In another aspect, it is possible to deactivate the second control means in the anti-torque mode of operation.

Furthermore, when the tail rotor is requested to swivel about a swivel axis to pass from an anti-torque mode of operation to a propulsion mode of operation, the aircraft having a given forward speed when the swiveling is requested, the second pitch is increased progressively in order to maintain the aircraft at a forward speed greater than or equal to the given forward speed.

Under such circumstances, the swiveling of the tail rotor does not degrade flying conditions.

In parallel, when swiveling of the tail rotor is requested about a swivel axis to pass from an anti-torque mode of operation to a propulsion mode of operation, the first pitch may be reduced progressively.

With the tail rotor contributing progressively to propulsion, it becomes possible to off-load the rotary wing by reducing the pitch of the first blades so as to reduce the lift of said rotary wing, and thus to reduce the power consumed by the rotary wing.

Furthermore, when swiveling of the tail rotor is requested about a swivel axis to pass from an anti-torque mode of operation to a propulsion mode of operation, the first salient angle is reduced automatically to a first given angle less than the predetermined threshold for which the yaw movement of the aircraft is zero, in order to move the axis of rotation of the second blades closer to the first plane in order to counter the resilient toque from the rotary wing.

The swivel order thus causes the tail rotor to swivel automatically until said first salient angle reaches said given angle that generates zero yaw movement of the aircraft. Nevertheless, it is possible to interrupt the decrease in the first salient angle and thus in the automatic swiveling of the tail rotor, should it be necessary to modify the yaw attitude of the aircraft.

In the event of disturbances being detected by a gyro measuring the yaw angle of the aircraft, automatic swiveling of the tail rotor is interrupted. Such disturbances may be caused either by atmospheric events such as gusts of wind, or by the pilot acting on the first control means.

Finally, in an option, swiveling of the tail rotor to go from an anti-torque mode of operation to a propulsion mode of operation is allowed, providing the forward speed of the aircraft is greater than a minimum transition speed.

Below the minimum transition speed, the aircraft is not in a position to counter the torque generated by the rotary wing on the airframe of said aircraft while in the propulsion mode of operation. Under such circumstances, it is possible to prohibit transition into that configuration in order to avoid an incident.

By way of example, the minimum transition speed may be determined by testing, insofar as this speed depends on the weight of the aircraft, and on its aerodynamic drag, in particular. The minimum transition speed thus differs from one aircraft to another. Furthermore, safety margins may be incorporated relative to a theoretical minimum transition speed.

The changeover from one mode of operation to another is thus authorized, providing predetermined air flow conditions are satisfied.

Finally, at least one airfoil in elevation may be controlled to occupy positions on either side of said first plane. This airfoil may be a flap arranged on a fin in elevation, the airfoil being controlled for example so as to lie substantially in the air stream sucked through the tail rotor in the propulsion mode of operation.

This airfoil is thus controlled to combat the yaw movement caused by weather disturbances, in particular.

Adding a fin in elevation that is appropriately positioned serves to maintain a heading. In addition, given the inertia it provides, the fin in elevation serves to minimize the sensitivity of the aircraft to disturbances, in particular lateral aerodynamic disturbances. The movable airfoil of said fin additionally provides the aircraft with the ability to react when faced with such disturbances.

In addition to the method, the invention provides an aircraft suitable for implementing the method. The aircraft is provided with an airframe carrying at least one rotary wing including a plurality of first blades having a first variable pitch and a tail rotor suitable for swiveling to pass reversibly from an anti-torque mode of operation in which the tail rotor is suitable for controlling the yaw of the aircraft to a propulsion mode of operation using vector thrust on either side of an antero-posterior first plane of symmetry of the aircraft in which the tail rotor is suitable for swiveling about a swivel axis to control yaw and to control propulsion of the aircraft, at least in part, the tail rotor including a plurality of second blades having a second variable pitch and rotating about an axis of rotation, the axis of rotation presenting a variable first salient angle relative to the first plane. This aircraft then comprises:

a tail power gearbox having a stationary portion secured to the airframe and a moving portion connected to the tail rotor to enable the tail rotor to swivel about the swivel axis;

swivel means for swiveling the moving portion;

first control means controlling the second pitch in the anti-torque mode of operation and controlling the swivel means in the propulsion mode of operation;

second control means controlling the second pitch in the propulsion mode of operation; and a switch device for passing from one mode of operation to the other.

The aircraft may posses one or more of the following additional characteristics.

For example, said switch device includes a transition button for requesting changeover from one mode of operation to the other.

Furthermore, the switch device may include switch means serving:

in the anti-torque mode of operation, to connect the first control means with means for modifying the second pitch;

in the propulsion mode of operation, to connect the second control means to the means for modifying the second pitch; and in the propulsion mode of operation, to connect the first control means to the swivel means.

In addition, the aircraft optionally includes an angle sensor for measuring the first salient angle.

Furthermore, the aircraft may include equally well at least one moving airfoil in elevation presenting a second variable salient angle relative to the first plane.

BRIEF DESCRIPTION OF THE DRAWINGS

The invention and its advantages appear in greater detail from the following description of embodiments given by way of illustration with reference to the accompanying figures, in which.

DETAILED DESCRIPTION OF THE PREFERRED EMBODIMENTS

Elements present in more than one of the figures are given the same references in each of them.

It should be observed that three mutually orthogonal directions X, Y, and Z are shown in FIGS. 1 to 4.

The direction X represents the longitudinal axis of the aircraft shown diagrammatically and another direction Y represents the transverse axis of the aircraft.

Finally, a third direction Z is said to be "in elevation" and it corresponds to the elevation axis of the aircraft.

Figures 1, 2, 3:
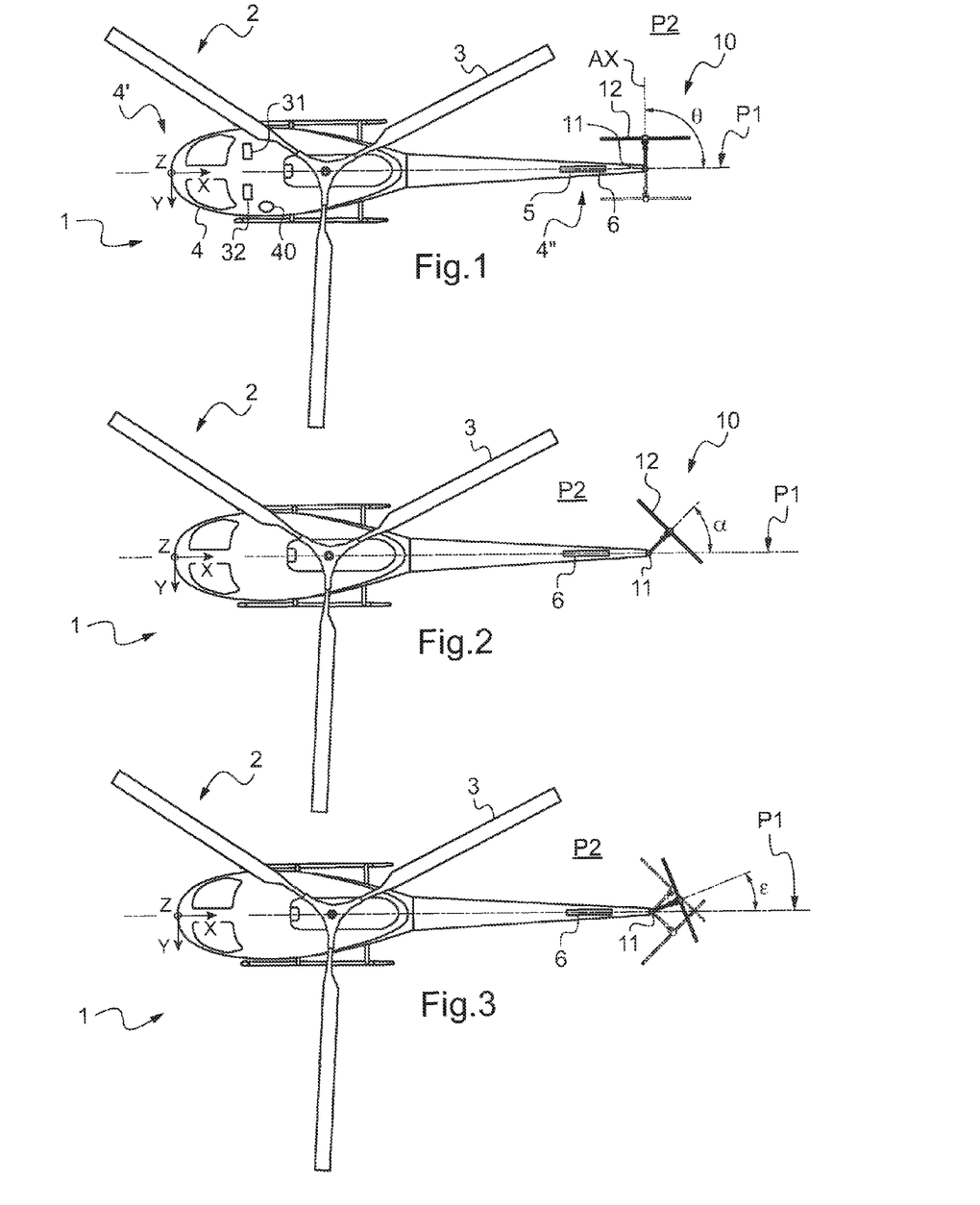
FIGS. 1 to 3 are diagrams explaining the method of the invention.

FIG. 1 shows an aircraft 1 having a fuselage 4 extending longitudinally along a first antero-posterior plane of symmetry P1 in elevation from a front end 4' to a rear end 4". It should be observed that the first plane P1 is defined by the longitudinal axis X and by the elevation axis Z.

The airframe 4 carries a rotary wing 2 having a main rotor comprising a plurality of first blades 3. The aircraft possesses members for modifying the first pitch of the first blade 3, such as a set of cyclic swashplates controlled by a cyclic stick suitable for causing the first pitch of the first blade 3 to vary cyclically, and a collected pitch lever suitable for causing the first pitch of all of the first blades 3 to vary collectively.

Furthermore, the rear end 4" of the airframe 4 carries a tail rotor 10 fitted with a plurality of second blades 12 rotating about an axis of rotation AX, the second pitch of the second blades 12 being modifiable.

The tail rotor may also swivel about a swivel axis 11 to pass from an anti-torque mode of operation in which the aircraft behaves like a conventional helicopter, to a propulsion mode of operation in which the aircraft can be considered as being an aircraft having vector thrust. Under such circumstances, in the anti-torque mode of operation the tail rotor is held in a constant given position, whereas in the propulsion mode of operation the tail rotor 10 may swivel about the swivel axis.

With reference to FIG. 1, the axis of rotation AX can thus swivel about the swivel axis 11 by moving in a second plane P2, e.g. orthogonal to the first plane P1 and parallel to a plane defined by the longitudinal and transverse axes X and Y of the aircraft.

In the anti-torque mode of operation, this axis of rotation AX is held in a constant position, e.g. being orthogonal to the first plane P1 in order to counter the torque generated by the rotary wing 2 on the airframe 4. The axis of rotation AX then presents a first salient angle θ between the axis of rotation AX and the first plane P1, which first salient angle θ is optionally a right angle in the anti-torque mode of operation. More precisely, the first salient angle θ lies between the axis of rotation AX and the line of intersection between the first and second planes P1 and P2.

In contrast, in the propulsion mode of operation, the axis of rotation AX may swivel about the swivel axis 11 so as to direct the mass of air passing through the tail rotor 10 rearwards from the aircraft. The tail rotor 10 thus pivots on either side of the first plane P1 in order firstly to contribute to propelling the aircraft and secondly to control movement of the aircraft in yaw. For example, the first salient angle θ may vary over a range of 180° from the position of the tail rotor 10 shown in continuous lines in FIG. 1 to the position of the tail rotor 10 shown in dotted lines in FIG. 1.

In order to control the tail rotor 10, the pilot uses first control means 31, such as pedals, and second control means 32, e.g. a three-state pushbutton and/or an analog rotary button.

In the anti-torque mode of operation, use is made more precisely of the first control means 31 for modifying the second pitch of the second blade 12 of the tail rotor 10. Thus, by using the first control means 31, the pilot controls the aircraft 1 in yaw by varying the amplitude of the thrust generated by the tail rotor 10.

In parallel, the second control means 32 are deactivated for safety reasons.

In contrast, in the propulsion mode of operation, the first control means 31 are used for swiveling the tail rotor 10 relative to the first plane P1 by setting the value of the first salient angle θ, and the second control means 32 are used for modifying the second pitch of the second blades 12. Under such circumstances, the pilot continues to control the aircraft in yaw by using the first control means 31, but controls the forward speed of the aircraft by using the second control means 32, in particular.

Furthermore, the aircraft may possess at least one movable airfoil 6 in elevation, such as a flap arranged on a vertical fin. In accordance with the method of the invention, it is possible to control this airfoil 6 to pivot on either side of the first plane P1. This airfoil may be controlled by the first control means 31, e.g. in order to be arranged in the air stream sucked through the tail rotor 10. Logical control means may also control this airfoil 6 as a function of gyro information in order to combat a temporary yaw inclination of the aircraft, e.g. caused by an air-flow disturbance.

In order to go from the anti-torque mode of operation to the propulsion mode of operation, the aircraft includes switch means 40.

The pilot uses the switch means 40 to change the mode of operation. In a variant, it can be understood that the autopilot system may also actuate the switch means 40.

Under such circumstances, when swiveling the tail rotor 10 about the swivel axis 11 is required so that the tail rotor 10 goes from the anti-torque mode of operation to the propulsion mode of operation, pivot means (not shown in FIG. 1) automatically swivel the tail rotor 10 during a transition stage.

Nevertheless, in a variant of the invention, the tail rotor 10 is allowed to swivel only if the forward speed of the aircraft is greater than a predetermined minimum transition speed.

With reference to FIG. 2, when the first salient angle θ becomes less than a predetermined threshold α, there is a changeover from the anti-torque mode of operation to the propulsion mode of operation. The action of the first and second control means 31 and 32 then changes.

With reference to FIG. 3, the transition stage, and thus the automatic swiveling of the tail rotor 10 about the swivel axis 11, is stopped:

finally when the first salient angle θ reaches a given angle ε, said given angle ε being less than the predetermined threshold α; or at least momentarily when the yaw attitude of the aircraft is modified, for example by some minimum angle for some minimum duration under the action of a gust of wind or a maneuver by the pilot, for example.

Furthermore, while automatic swiveling of the tail rotor 10 seeking to bring the axis of rotation AX towards the first plane P1, on passing the tail rotor 10 from the anti-torque mode of operation to the propulsion mode of operation, it is possible progressively to increase the second pitch in order to maintain the aircraft at a forward speed greater than or equal to a given forward speed. Preferably, the given forward speed is equal to the forward speed of the aircraft when the change of mode is requested.

Furthermore, during this automatic swiveling, the first pitch of the first blade 3 of the rotary wing 2 may be reduced progressively.

In order to go from the propulsion mode of operation to the anti-torque mode of operation, the pilot requests swiveling of the tail rotor by using the switch device.

The tail rotor 10 then swivels about the swivel axis 11 so as to return to the constant position shown in FIG. 1. Furthermore, when the first salient angle θ becomes greater than the predetermined threshold α, the first control means once more control the second pitch, and the second control means become inoperative.

It should be observed that timing may be organized to guarantee that the increase in the first salient angle θ beyond the predetermined threshold α is not the result of air flow disturbances.

Furthermore, in parallel with the tail rotor 10 swiveling, it is possible progressively to reduce the second pitch of the second blades 12 of the tail rotor 10 and to increase progressively the first pitch of the first blades 3 of the rotary wing 2.

Figure 4:
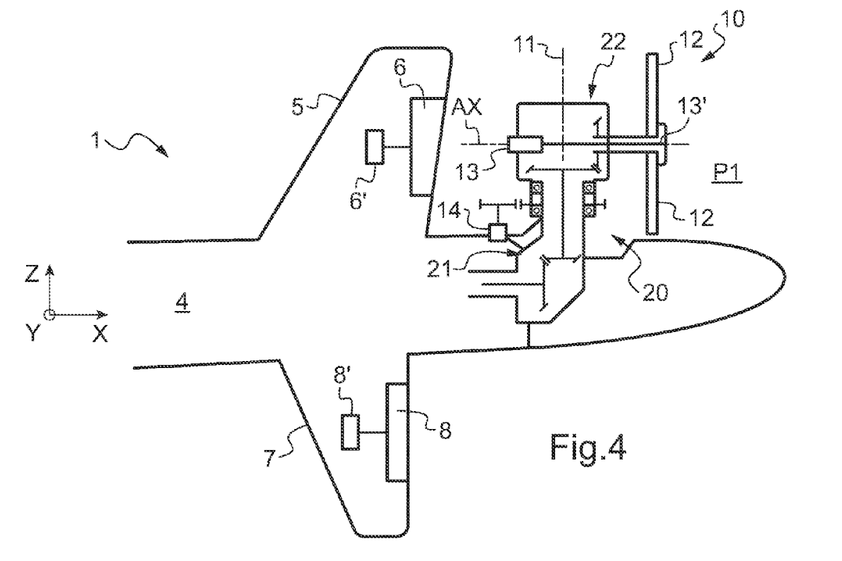
FIG. 4 is a section showing a tail rotor and airfoils of the invention.

FIG. 4 is a section of a tail rotor 10 in an aircraft 1 of the invention. The tail rotor 10 is arranged on the rear end 4" of the airframe 4 of the aircraft 1.

The aircraft 1 includes a tail power gearbox 20 driven by a power plant (not shown), the tail gearbox rotating the second blades 12 about the axis of rotation AX.

This tail gearbox 20 is provided with a stationary portion 21 that is secured to the airframe 4 by a connection 21" and it is driven by the power plant. Furthermore, the tail gearbox 20 is provided with a moving portion 22 carrying and driving the tail rotor 10, the moving portion 22 co-operating with the stationary portion 21.

The aircraft 1 also includes swivel means 14 suitable for swiveling the moving portion 22 relative to the stationary portion 21 of the tail gearbox 20 about a swivel axis 11.

The swivel means 14 are constituted, for example, by an electric motor secured to the airframe 4 and/or to the stationary portion 21 of the tail gearbox 20. This electric motor meshes with a peripheral gear on the moving portion. It will be understood that the moving portion 22 is movable in rotation relative to the stationary portion 21 that is secured to the airframe 4 by means of a rotary connection made by means of self-lubricating smooth or rolling bearings.

Furthermore, the aircraft includes means for modifying the second pitch of the second blades 12 of the tail rotor 10. These modification means may possess a servo-control 13 provided with an outlet shaft 13' connected to the second blades for example via a system referred to by the person skilled in the art as a "spider". These means for modifying the second pitch are then secured to the moving portion 22 of the tail gearbox 20, and more precisely to an external fairing of said moving portion 22.

In the anti-torque mode of operation of the tail rotor 10, the switch device 40 puts the first control means 31 into communication with the servo-control 13. In contrast, in the propulsion mode of operation, the switch device 40 puts the first control means 31 into communication with the swivel means 14 and puts the second control means 32 in communication with the servo-control 13.

FIG. 4 also shows the optional presence of two airfoils 6 and 8 in elevation that are arranged on respective fins 5 and 7 in elevation. Each airfoil can be tilted on either side of the first plane P1 by tilt means 6' or 8', e.g. of the electric motor type.

Figure 5:
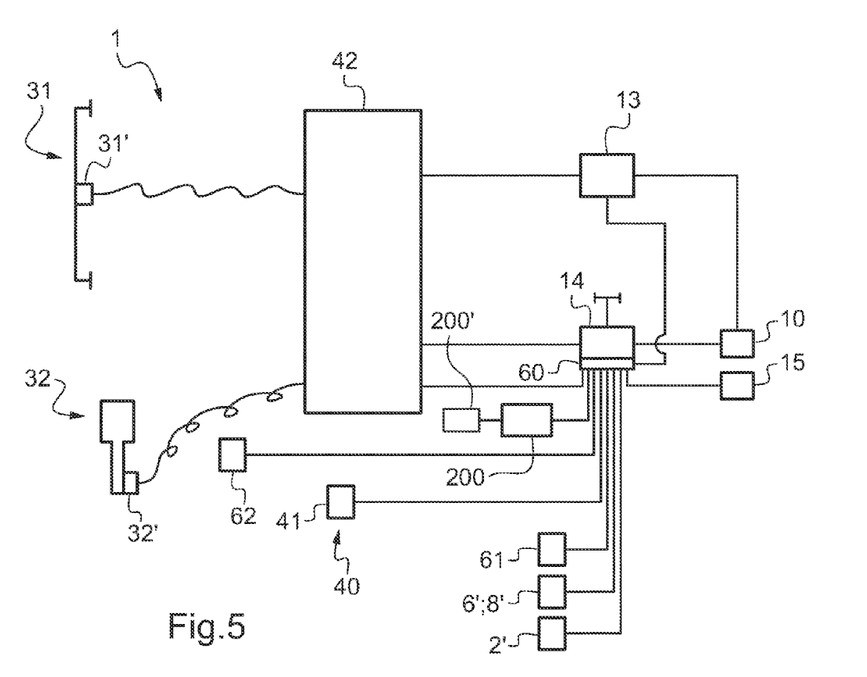
FIG. 5 is a diagram for explaining a first embodiment.

FIG. 5 is a diagram for explaining a first embodiment.

Independently of the embodiment, the switch device 40 may include a transition button 41. For example, the transition button is a two-position switch, having a first position for the anti-torque mode of operation and a second position for the propulsion mode of operation.

In addition, the switch device 40 may include switch means 42 connected to the first control means 31 and to the second control means 32. For example, the first control means 31 comprise a first position sensor 31' sending a first electrical signal to the switch means 42, the second control means 32 including a second position sensor 32' sending a second electrical signal to the switch means 42.

In addition, the switch means are connected to the servo-control 13 and to the swivel means 14.

In the first embodiment, the switch means are constituted by an electronic switch unit provided with an electric circuit for connecting the first control means to the servo-control 13 in the anti-torque mode of operation, and for connecting the first control means 31 to the swivel means 14 and connecting the second control means 32 to the servo-control 13 in the propulsion mode of operation.

Furthermore, the aircraft 1 may include a logic unit 60 connected to the transition button 41. This logic unit is shown adjacent to the swivel means 41 in FIG. 5, however it could form part of the switch means 42, for example. In another variant, the switch means 42 and the logic unit form part of the autopilot system of the aircraft.

The logic unit then receives instructions from the transition button 41 and delivers setpoints to the switch means 42.

It should be observed that the logic unit may also communicate with:

an angle sensor 15 suitable for delivering information relating to the position of the tail rotor 10;

speed measurement means 200 for measuring the forward speed of the aircraft, e.g. provided with a Pitot tube 200';

a gyro 61;

the tilt means 6', 8' for tilting respective airfoils 6, 8; and members for modifying the pitch 2' of the first blades 3 of the rotary wing via an autopilot system of the aircraft or via actuators connected in series and/or in parallel with the linkages for controlling said first pitch, for example.

This logic unit may be an electronics card, e.g. provided with a processor or any other equivalent means, possibly such as a logic electronic circuit.

When the pilot seeks to go from the anti-torque mode of operation to the propulsion mode of operation, the pilot moves the transition button to its second position corresponding to the propulsion mode of operation. An electrical signal is sent to the logic unit 60 in order to request the appropriate operations.

The logic unit 60 is adjacent to or even incorporated in the swivel means in the example shown. Nevertheless, it can be understood that the logic unit may be located elsewhere without going beyond the ambit of the invention.

In a preliminary step, the logic unit may verify that the conditions required for transition are united. Thus, the logic unit calls on the measurement means 200 to determine whether the forward speed of the aircraft is greater than a predetermined minimum transition speed.

If not, the logic unit 60 warns the pilot, by audible or visible alert means 62, for example. The logic unit may also keep the transition button in its initial position.

If the conditions required for transition are united, then the logic unit enables electrical power to be delivered to the swivel means. Thus, the swivel motor cannot act on the tail rotor while the aircraft is behaving as a conventional helicopter, i.e. while the tail rotor is operating in the anti-torque mode of operation.

Thereafter, the logic unit 60 orders the swivel means to swivel the tail rotor about the swivel axis 11.

When the angle sensor 15 informs the logic unit that the first salient angle θ has dropped below a predetermined threshold α, the logic unit 60 orders the switch means to connect the first control means 31 with the swivel means 14 and the second control means 32 with the servo-control 13.

By convention, it is recalled that the first salient angle θ has a positive value when the tail rotor is in the constant position required during the anti-torque mode of operation, this first salient angle θ having a value zero when the axis of rotation AX lies in the first plane P1, and the first salient angle θ has a negative value when the tail rotor is in a position that is symmetrical to said first position relative to said first plane.

Furthermore, the logic unit 60 continues to order automatic swiveling of the tail rotor, this swiveling automatically giving rise to a reduction of the first salient angle θ in application of the convention stated above.

The logic unit stops automatic swiveling when either one of the following two conditions is satisfied:

the first salient angle θ reaches a given angle ε, the given angle εbeing less than the predetermined threshold α; and the yaw attitude of the aircraft is modified, the logic unit being informed of such a modification in the yaw attitude of the aircraft by a gyro 61.

In parallel with the automatic reduction, the logic unit 60 may request a progressive increase in the second pitch of the second blades of the tail rotor 10 via the servo-control 13 and a decrease in the first pitch of the first blades of the rotary wing, acting via the pitch-modifier members 2'.

Finally, the logic unit is capable of controlling the airfoils 6', 8' that are in elevation, as a function of information coming from the gyro 61 or from the position of the first control means 31, for example.

Figure 6:
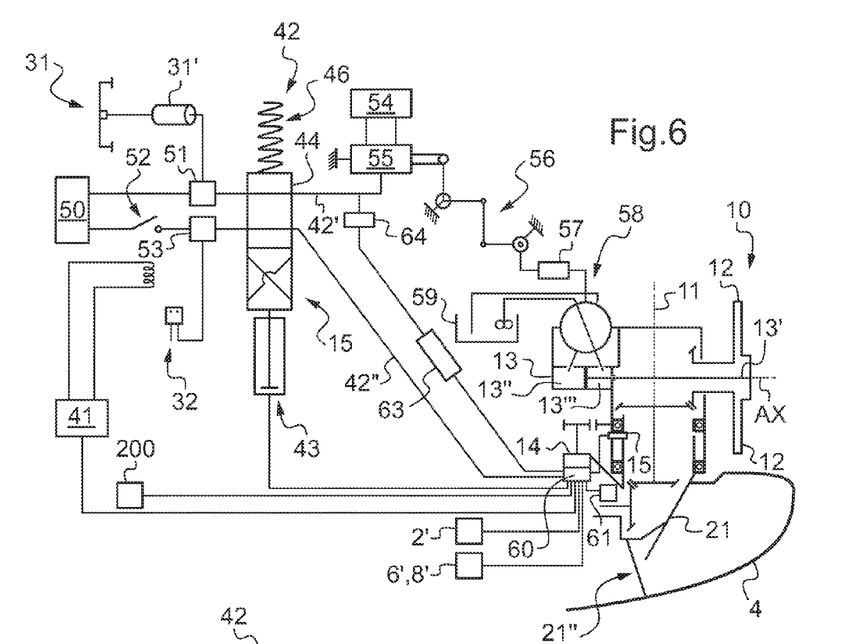
FIG. 6 is a diagram for explaining a second embodiment having a tail rotor in an anti-torque mode of operation.
Figure 7:
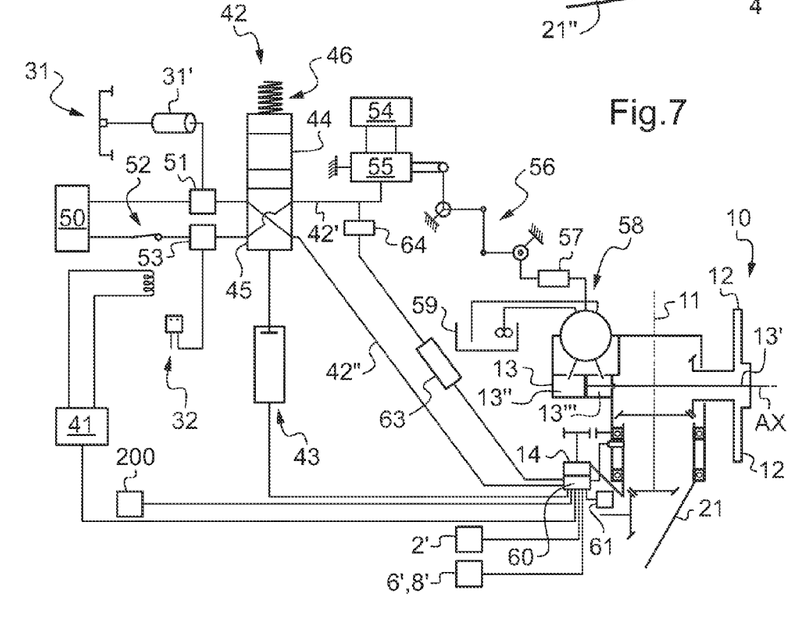
FIG. 7 is a diagram showing a second embodiment having a tail rotor in a propulsion mode of operation.

FIGS. 6 and 7 show a second embodiment.

The aircraft includes an electricity generator connected to a first logic gate 51 in communication with a position sensor 31' of the first control means 31. The first logic gate 51 is connected to the switch means 42, the first logic unit 51 being of a conventional type, e.g. being provided with a transistor.

In addition, the electricity generator 50 is connected to a second coder 53 via a switch 52, a second logic gate 53 being in communication with the second control means 32. The second logic gate 53 is connected to the switch means 42, the second logic gate 53 being of a conventional type, e.g. being provided with a transistor.

Under such conditions, the transition button 41 is connected to a coil that opens the switch 52 when said transition button 41 is in a first position corresponding to the anti-torque mode of operation of the tail rotor, the coil closing the switch 52 when the transition button is in a second position corresponding to the propulsion mode of operation.

The switch means 42 comprise a two-position switch having two output ports 42', and 42".

The first port 42' serves to transmit a setpoint to a control actuator 55 that is powered electrically or hydraulically by a dedicated member 54. The control actuator 55 is then connected to a hydraulic manifold 58 of a servo-control 13 by a linkage 56 and follower means 57 serving to act on the hydraulic manifold regardless of the angular position of the tail rotor.

The hydraulic manifold 58 shown is a rotary manifold communicating with a tank 59, the hydraulic manifold 58 being capable of feeding fluid to first and second chambers 13" and 13'" of the servo-control.

By extending or retracting as a function of the received setpoint, the control actuator 55 requires the first or the second chamber 13" or 13'" of the servo-control to be fed with fluid. The outlet shaft 13' is extended when the first chamber 13" is filled, e.g. in order to increase the second pitch of the second blades 12, with this outlet shaft 13' retracting when the second chamber 13'" is filled, e.g. for the purpose of reducing the second pitch of the second blades 12.

It should be observed that the aircraft may include a parallel actuator 64 arranged in parallel with the connection connecting the control actuator 55 and the switch means 42.

This parallel actuator 64 may be connected to an autopilot system 63. The autopilot system 63 may request a modification of the second pitch via said member 64, possibly on an order from the logic unit 60.

The logic unit 60 may also be connected directly to the parallel actuator 64 in order to request an increase in the second pitch on passing from the anti-torque mode of operation to the propulsion mode of operation, or a decrease in the second pitch on passing from the propulsion mode of operation to the anti-torque mode of operation.

Furthermore, the second port 42" is connected to the swivel means 14, e.g. via the logic unit 60.

The switch means 42 then comprises a slider provided with a first portion 44 and a second portion 45, the slider co-operating with a spring 46 and shifter means 43 of the actuator type controlled by the logic unit 60.

With reference to FIG. 6, in the anti-torque mode of operation, the shifter means 43 are retracted so as to interpose the first portion 44 between the first and second outlet ports 42' and 42" on one side and the first and second coders 51 and 53 on the other side.

More precisely, the first portion 44 puts the first logic gate 51 into communication with the first output port 42' and also puts the second logic gate 53 in communication with the second output port 42".

The first control means 31 then acts on the second pitch of the second blades 12 via the servo-control 13. However, since the switch 52 is open, the second control means 32 are inactive, the second control means 32 thus not transmitting any swivel order to the tail rotor 10.

With reference to FIG. 7, in the propulsion mode of operation, the shifter means 43 is extended so as to interpose the second portion 45 between the first and second output ports 42' and 42" on one side and the first and second coders 51 and 53 on the other side.

More precisely, the second portion 45 puts the second logic gate 53 into communication with the first output port 42' and also puts the first logic gate 51 into communication with the second output port 42".

Under such circumstances, the first control means 31 act on the angular position of the tail rotor 10 relative to the first plane P1. Furthermore, since the switch 52 is closed, the second control means 32 become active, the second control means 42 controlling the second pitch of the second blades 12 via the servo-control 13.

It should be observed that the switch means 42 may also be an electronics switch delivering the orders from the first and second control means appropriately as a function of an order given by the logic unit 60.

In order to go from the anti-torque mode of operation to the propulsion mode of operation, a pilot operates the transition button 41. The transition button 41 then puts the switch 52 into the closed position and electrically powers the swivel means 14. Furthermore, the transition button 41 activates the logic unit 60 to request the beginning of the transition phase enabling the tail rotor to go from one mode of operation to the other.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A method of piloting an aircraft having at least one rotary wing comprising a plurality of first blades having a first variable pitch in order to provide the aircraft at least with lift, said aircraft being provided with a tail rotor suitable for swiveling to go reversibly from an anti-torque mode of operation in which said tail rotor is suitable for controlling the yaw movement of said aircraft to a propulsion mode of operation in which said tail rotor is suitable for swiveling about a swivel axis to control yaw movement in vector manner on either side of an antero-posterior first plane (P1) of symmetry of the aircraft and to control propulsion of said aircraft, at least in part, said tail rotor having a plurality of second blades having a variable second pitch and rotating about an axis of rotation (AX), said axis of rotation presenting a variable first salient angle ($\theta$) relative to said first plane (P1), said method comprising:
    in the anti-torque mode of operation, controlling said second pitch using first control means; and
    in the propulsion mode of operation, controlling the first salient angle ($\theta$) using said first control means and controlling said second pitch using second control means.

2. A method according to claim 1, wherein when swiveling of the tail rotor is required to pass from one mode of operation to another, a changeover from the anti-torque mode of operation to the propulsion mode of operation is performed when said first salient angle ($\theta$) becomes less than a predetermined threshold ($\alpha$), and a changeover from the propulsion mode of operation to the anti-torque mode of operation is performed when said first salient angle ($\theta$) becomes greater than said first predetermined threshold ($\alpha$).

3. A method according to claim 1, wherein said second control means are deactivated in the anti-torque mode of operation.

4. A method according to claim 1, wherein when the tail rotor is requested to swivel to pass from an anti-torque mode of operation to a propulsion mode of operation, said aircraft having a given forward speed when said swiveling is requested, the second pitch is increased progressively in order to maintain said aircraft at a forward speed greater than or equal to said given forward speed.

5. A method according to claim 1, wherein when swiveling of the tail rotor is requested to pass from an anti-torque mode of operation to a propulsion mode of operation, said first pitch is reduced progressively.

6. A method according to claim 1, wherein when swiveling of the tail rotor is requested to pass from an anti-torque mode of operation to a propulsion mode of operation, said first salient angle ($\theta$) is reduced automatically to a first given angle ($\epsilon$) less than said predetermined threshold ($\alpha$) for which the yaw movement of said aircraft is zero.

7. A method according to claim 6, wherein said reduction is interrupted when the yaw attitude of said aircraft is modified.

8. A method according to claim 1, wherein swiveling of the tail rotor to go from an anti-torque mode of operation to a propulsion mode of operation is allowed, providing the forward speed of said aircraft is greater than a minimum transition speed.

9. A method according to claim 1, wherein at least one airfoil in elevation is controlled to occupy positions on either side of said first plane (P1).

10. An aircraft suitable for implementing the method according to claim 1, said aircraft comprising an airframe carrying at least one rotary wing including a plurality of first blades having a first variable pitch and a tail rotor suitable for swiveling to pass reversibly from an anti-torque mode of operation in which said tail rotor is suitable for controlling the yaw of said aircraft to a propulsion mode of operation using vector thrust on either side of an antero-posterior first plane (P1) of symmetry of said aircraft in which said tail rotor is suitable for swiveling about a swivel axis to control yaw and to control propulsion of said aircraft, at least in part, said tail rotor including a plurality of second blades having a second variable pitch and rotating about an axis of rotation (AX), said axis of rotation (AX) presenting a variable first salient angle ($\theta$) relative to said first plane (P1), the aircraft further comprising:
    a tail power gearbox having a stationary portion secured to said airframe and a moving portion connected to said tail rotor to enable said tail rotor to swivel;
    swivel means for swiveling said moving portion;
    first control means controlling said second pitch in the anti-torque mode of operation and controlling said swivel means in the propulsion mode of operation;
    second control means controlling said second pitch in the propulsion mode of operation; and
    a switch device for passing from one mode of operation to the other.

11. An aircraft according to claim 10, wherein said switch device includes a transition button for requesting changeover from one mode of operation to the other.

12. An aircraft according to claim 10, wherein said switch device includes switch means serving:
    in the anti-torque mode of operation, to connect said first control means with means for modifying said second pitch;

in the propulsion mode of operation, to connect said second control means to said means for modifying said second pitch; and in the propulsion mode of operation, to connect said first control means to said swivel means.

13. An aircraft according to claim 10, including an angle sensor for measuring said first salient angle ($\theta$).

14. An aircraft according to claim 10, including equally well at least one airfoil in elevation presenting a second variable salient angle relative to said first plane (P1).

15. A method according to claim 1, wherein when said tail rotor is required to pivot in order to move from said anti-torque mode of operation to said propulsion mode of operation, said first pitch is progressively reduced.

16. A method of piloting an aircraft having at least one rotary wing comprising a plurality of first blades having a first variable pitch capable of providing the aircraft with lift, the aircraft having a tail rotor having an anti-torque mode of operation in which the tail rotor is suitable for controlling the yaw movement of the aircraft and a propulsion mode of operation in which the tail rotor is suitable for swiveling about a swivel axis to assist in controlling yaw movement on either side of an antero-posterior first plane (P1) of symmetry of the aircraft and to assist in controlling propulsion of the aircraft, the tail rotor having a plurality of second blades having a variable second pitch and rotating about an axis of rotation (AX), the axis of rotation presenting a variable first salient angle ($\theta$) relative to said first plane (P1), the method comprising:

in the anti-torque mode of operation, the second pitch is controlled using a first controller; and in the propulsion mode of operation, the first salient angle ($\theta$) is controlled using the first controller and the second pitch is controlled using a second controller.

17. A method according to claim 16, wherein when swiveling of the tail rotor is required to pass from one mode of operation to another, a changeover from the anti-torque mode of operation to the propulsion mode of operation is performed when the first salient angle ($\theta$) becomes less than a predetermined threshold ($\alpha$), and a changeover from the propulsion mode of operation to the anti-torque mode of operation is performed when the first salient angle ($\theta$) becomes greater than the first predetermined threshold ($\alpha$).

18. A method according to claim 16, wherein the second controller is deactivated in the anti-torque mode of operation.

19. A method according to claim 16, wherein when swiveling of the tail rotor is requested to pass from an anti-torque mode of operation to a propulsion mode of operation, the first pitch is reduced progressively.

20. A method according to claim 16, wherein when the tail rotor is required to pivot in order to move from the anti-torque mode of operation to the propulsion mode of operation, the first pitch is progressively reduced.

* * * * *